US012731554B2

(12) United States Patent
Knausz et al.

(10) Patent No.: US 12,731,554 B2
(45) Date of Patent: Sep. 8, 2026

(54) CURRENT STEERING FOR HIGH-FREQUENCY PIXEL MODULATION

(71) Applicant: Daktronics, Inc., Dublin (IE)

(72) Inventors: Imre Knausz, Fairport, NY (US); Matthew Alexander Meitl, Durham, NC (US); Ronald S. Cok, Rochester, NY (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 18/766,892

(22) Filed: Jul. 9, 2024

(65) Prior Publication Data

US 2025/0095595 A1 Mar. 20, 2025

Related U.S. Application Data

(60) Provisional application No. 63/538,459, filed on Sep. 14, 2023.

(51) Int. Cl.
*G09G 3/34* (2006.01)

(52) U.S. Cl.
CPC ... *G09G 3/3406* (2013.01); *G09G 2340/0435* (2013.01)

(58) Field of Classification Search
CPC .................. G09G 3/3233; G09G 3/32; G09G 2300/0842; G09G 2300/0819
See application file for complete search history.

(56) References Cited

U.S. PATENT DOCUMENTS

| | | | | |
|---|---|---|---|---|
| 7,616,126 B2 * | 11/2009 | Kadwell | G08B 17/113 340/630 |
| 10,411,600 B1 * | 9/2019 | Challa | H05B 45/395 |
| 11,272,591 B1 * | 3/2022 | Lee | H02H 3/087 |
| 11,737,190 B2 * | 8/2023 | Hariharan | H05B 45/36 315/119 |
| 2018/0049283 A1 * | 2/2018 | Lee | H05B 45/38 |
| 2018/0220502 A1 * | 8/2018 | Morales | H05B 45/48 |
| 2019/0081601 A1 * | 3/2019 | Hurwitz | H03M 1/124 |

* cited by examiner

*Primary Examiner* — Van N Chow

(74) *Attorney, Agent, or Firm* — Schwegman Lundberg & Woessner, P.A.

(57) ABSTRACT

A current-load control circuit can include a first and second current loads, a current source, and a current-steering switch. The current-steering switch is operable to connect the first current load to the current source in a first switch mode to direct electrical current from the current source through the first current load and is operable to connect the second current load to the current source in a second switch mode different from the first switch mode to direct electrical current from the current source through the second current load. The first current load can be a light emitter. The second current load can be a light emitter or a non-emissive current load. A display can include an array of current-load control circuits. A digital camera can record images shown on the display to communicate information from the display to the digital camera.

21 Claims, 9 Drawing Sheets

CURRENT STEERING FOR HIGH-FREQUENCY PIXEL MODULATION

PRIORITY APPLICATION

This application claims the benefit of U.S. Provisional Patent Application No. 63/538,459, filed on Sep. 14, 2023, the disclosure of which is hereby incorporated by reference herein in its entirety.

TECHNICAL FIELD

The present disclosure relates generally to devices and methods for controlling light output from light emitters, for example pixels in a display.

BACKGROUND

Optical systems are widely used to communicate between remote locations. Typical optical communication systems transmit optical signals from a laser to a photosensor over fiber optic cables. Some cables transmit a single signal through a single-mode fiber, other cables transmit multiple signals through a multi-mode fiber. Free-space optical systems transmit optical signals through free space (e.g., the atmosphere or outer space) with modulated laser light detected by a photosensor positioned within the laser beam.

There is an increasing need for communication bandwidth and computation to support such applications as artificial intelligence, internet search fulfilment, and internet services requiring internet-accessible computers. To support this need, a large number of computers must compute and communicate and are often co-located in data centers. Conventionally, the computers in a data center communicate electronically, for example through wired ethernet connections. More recently, fiber optic cables can connect computers within a single data center. However, the physical size of the cables and their length is becoming a limitation on the computational capacity of connected computers within a data center.

There is a need, therefore, for improvements in devices and methods for optical communication.

SUMMARY

The present disclosure provides, inter alia, architectures, structures, devices, and methods for improved high-frequency optical communication using arrays of pixels in a display.

According to embodiments of the present disclosure, a current-steering circuit can comprise a first current load that is a light emitter, a second current load different from the first current load, a current source or current sink, and a current-steering switch. The current-steering switch can be operable to connect the first current load to the current source or current sink in a first switch mode and is operable to connect the second current load to the current source or current sink in a second switch mode different from the first switch mode. Some embodiments comprise a third current load and the current-steering switch can be operable to connect the third current load to the current source or current sink in a third switch mode different from the first switch mode and different from the second switch mode. Some embodiments comprise a fourth current load and the current-steering switch can be operable to connect the fourth current load to the current source or current sink in a fourth switch mode different from any of the first switch mode, the second switch mode, or the third switch mode.

In some embodiments, the second current load is a non-light-emissive load. In some embodiments, the light emitter is a first light emitter, and the second current load is a second light emitter different from the first light emitter. The second light emitter can emit light that has a different frequency from light emitted by the first light emitter. The second light emitter can emit light that is not visible to the human visual system. A light emitter can be any one of a light-emitting diode, a laser, a diode-laser, or a vertical cavity surface-emission laser (VCSEL), any of which can be a micro light emitter, for example a micro-transfer-printed light emitter that can comprise a fractured (e.g., broken) or separated tether.

In some embodiments, the current-steering switch can be operable to switch current from the current source or to the current sink at a frequency no less than 1 MHz, 10 MHz, 100 MHz, or 1 GHz.

Embodiments of the present disclosure can comprise a substrate. The first current load can be disposed on a first location on the substrate and the second current load can be disposed on a second location on the substrate adjacent to the first current load.

The current source or current sink can be a constant-current source or constant-current sink. A current provided by the constant-current source or constant-current sink can be a current selected to optimize the efficiency of light emission from the light emitter.

In some embodiments, the current-steering switch comprises a current-steering transistor connected to each current load to control a flow of current through the current load and the current-steering transistor can be responsive to a switch-control signal. The current-steering switch can comprise a differential pair of transistors having sources and drains. In some embodiments the sources are connected in common to form a common connection and the drains form separate connections. In some embodiments the drains are connected in common to form a common connection and the sources form separate connections. One of the differential pair of transistors can be responsive to a positive switch-control signal and the other of the differential pair of transistors can be responsive to a negative version of the positive switch-control signal.

In some embodiments, the current-steering switch is responsive to a multi-bit switch-control signal comprising control bits. The current-steering switch can comprise (i) a first level comprising a differential pair of transistors controlled by a first control bit providing the switch-control signal and (ii) successive levels of differential pairs of transistors, each successive level controlled by a different control bit providing the switch-control signal and having the common connection of a differential pair of transistors connected in common to the separate connections of the previous level of the successive levels, and (iii) wherein the separate connections of the final level of the successive levels control the current flow through the current loads. Thus, each level can be controlled by a different bit of the multi-bit switch-control signal and the separate connections of each level are connected to common connections of the succeeding level.

In embodiments, each of the differential pair of transistors comprises sources and drains, wherein (i) the sources are connected in common to form a common connection and the drains form separate connections or (ii) the drains form a common connection and the sources form separate connections. In embodiments, the current source or current sink is a current source. In embodiments, the current source or current sink is a current sink.

According to some embodiments of the present disclosure, a current-steering display can comprise a plurality of current-steering circuits. The current-steering display can comprise a display substrate and the light emitters of the plurality of light emitters can be disposed in an array on the display substrate. The current-steering display can be a backlight. The current-steering display can be a high-frame-rate display.

Some embodiments of the present disclosure can comprise a current-load control circuit having a first current load, a second current load, a current source or current sink, and a current-steering switch. The current-steering switch can be operable to connect the first current load to the current source or current sink in a first switch mode and can be operable to connect the second current load to the current source or current sink in a second switch mode different from the first switch mode. The first current load can be a light emitter.

Some embodiments of the present disclosure can comprise a current-steering display having a plurality of pixels. Each pixel can comprise a first current load, a second current load, and a current-steering switch. A current source or current sink external to the pixels can be electrically connected to the first current load and electrically connected to the second current load or electrically connected to the current-steering switch. The current-steering switch can be operable to connect the first current load to the current source or current sink in a first switch mode and can be operable to connect the second current load to the current source or current sink in a second switch mode different from the first switch mode.

In embodiments, the current source or current sink is a current sink that is (i) electrically connected to the first current load and electrically connected to the second current load. In embodiments, the current source or current sink is a current sink that is (ii) electrically connected to the current-steering switch. In embodiments, the current source or current sink is a current source that is (ii) electrically connected to the current-steering switch. In embodiments, the current source or current sink is a current source that is (i) electrically connected to the first current load and electrically connected to the second current load.

According to embodiments of the present disclosure, an optical communication system can comprise a current-steering display and an image detector (e.g., a digital camera) disposed and operable to capture images displayed on the current-steering display. The first current load can be a first light emitter and the second current load can be a second light emitter. The image detector can be operable to capture light emitted by the first light emitter and can be operable not to capture light emitted by the second light emitter. The first current load can be a first light emitter (e.g., a first light-emitting diode) and the second current load can be a second light emitter (e.g., a second light-emitting diode). The image detector (e.g., digital camera) can be operable to capture light emitted by the first light emitter and is not operable to capture light emitted by the second light emitter.

The image detector can be a first image detector and the system can comprise a second image detector disposed and operable to capture images displayed on the current-steering display. The light emitter can be a first light emitter that emits a first color of light, and the second current load can be a second light emitter that emits a second color of light different from the first color of light. The first image detector can be operable to capture and record the first color of light and not the second color of light. The second image detector can be operable to capture and record the second color of light and not the first color of light.

In some embodiments, a method of operating a current-load control circuit comprises activating (e.g., turning on) the current source or current sink, controlling the current-steering switch to connect the current source or current sink to the first current load in the first switch mode, and controlling the current-steering switch to connect the current source or current sink to the second current load in the second switch mode.

In some embodiments, a method of operating an optical communication system comprises providing an optical communication system, receiving a display image comprising pixel data, displaying the display image by controlling the current-steering switch in each pixel responsive to the corresponding pixel data, capturing the display image with an image detector, recording the captured image, and processing the recorded image.

According to some embodiments, a color-sequential display comprises an array of current-steering circuits.

According to embodiments of the present disclosure, a method of receiving information can comprise generating a signal (e.g., an optical signal) by emitting light from a first light emitter and from a second light emitter that are electrically connected in a common circuit and receiving the signal with a light detector. Generating the signal can comprise repeatedly switching a path of current flow between at least through the first light emitter and through the second light emitter. The light detector can be spatially separated from the first light emitter and the second light emitter. Some embodiments comprise transmitting the signal through free space after which the signal is received by the light detector. Free space can be a vacuum, atmosphere, or a gas. First and second light emitters can be first and second current loads and can comprise first and second light-emitting diodes.

In embodiments, the light detector can be spatially separated from the first light emitter and the second light emitter by a distance of at least 2 meters (e.g., at least 5 m, at least 10 m, at least 20 m, or at least 50 m). In embodiments, the signal can be a digital signal of bits, the bits having one of two values. The first light emitter can correspond to a first of the two values and the second light emitter can correspond to a second of the two values (e.g., wherein the signal comprises a series of 1s and 0s determined by switching between the first light emitter and the second light emitter). In some embodiments, the light detector can be comprised in a digital camera (e.g., a digital optical camera). In some embodiments, the common circuit can comprise a current-steering switch electrically connected to the first light emitter and the second light emitter, and the switching is performed by the current-steering switch. In some embodiments, the switching comprises changing to which of the first light emitter and the second light emitter a current source provides current. In some embodiments, the switching comprises changing which of the first light emitter and the second light emitter are connected to a current sink. In some embodiments, the common circuit comprises a non-emissive current load and generating the signal comprises switching the path of current flow among through the first light emitter, through the second light emitter, and through the non-emissive current load.

In some embodiments, the common circuit is a pixel. In some embodiments, the pixel is comprised in an array of pixels comprised in a display. In some embodiments, the signal comprises visible light. In some embodiments, the signal comprises infrared or ultraviolet light. In some embodiments, the first light emitter and the second light emitter emit a same color light. In some embodiments, the first light emitter and the second light emitter are comprised in a current-steering circuit or a current-load control circuit.

According to embodiments of the present disclosure, a method of receiving information can comprise generating a signal with light emitted from a first light emitter and from a second light emitter and receiving the signal with a light detector. Generating the signal can comprise switching a path of current flow between through the first light emitter and through the second light emitter.

According to embodiments of the present disclosure, a method of displaying information, receiving information, or both displaying and receiving information can comprise displaying a first display image on a display and displaying a second display image on the display. The display can comprise an array of pixels. Each of the pixels can comprise a first light emitter and a second light emitter, wherein, independently for each of the pixels, while displaying the first display image, at most only one of the first light emitter and the second light emitter emits light. Displaying the second display image can comprise switching a path of current flow within at least one of the pixels such that, for the at least one of the pixels, while displaying the second display image, current flows differently through the first light emitter and the second light emitter than while displaying the first display image (e.g., such that light is emitted by a different one of the first light emitter and the second light emitter than when displaying the first display image).

In some embodiments, independently for each of the pixels, while displaying the first display image, only one of the first light emitter and the second light emitter emits light, and while displaying the second display image, light is emitted by a different one of the first light emitter and the second light emitter than when displaying the first display image. Some embodiments comprise receiving the first display image with a first image detector (e.g., digital camera), the image detector is spatially separated (e.g., over free space) from the display and, subsequently, receiving the second display image with a second image detector (e.g., that is the first image detector), the image detector is spatially separated (e.g., over free space) from the display.

Each of the pixels can comprise a non-emissive current load and displaying the first display image and/or displaying the second display image can comprise, for at least one of the pixels, directing current flow to the non-emissive current load and not to either the first light emitter or the second light emitter. The first display image can be a binary digital signal, the second display image can be a binary digital signal, or both. Some embodiments comprise simultaneously generating an individual digital signal using each of the pixels, wherein (i) the first display image corresponds to a bit in the digital signal for each of the pixels, (ii) the second display image corresponds to a bit in the digital signal for each of the pixels, or (iii) both (i) and (ii).

Embodiments of the present disclosure provide improvements in devices and methods for optical communication.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1A:
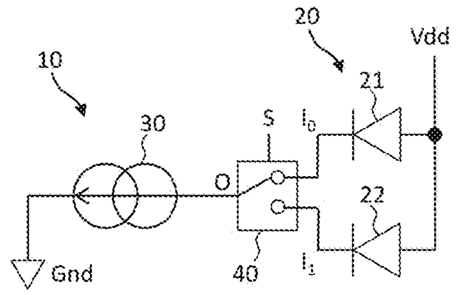
FIGS. 1A-1C are schematic diagrams of a current-steering circuit with two inputs comprising light emitters according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not necessarily drawn to scale.

DETAILED DESCRIPTION OF CERTAIN EMBODIMENTS

Free-space optical communication systems can suffer from limited bandwidth because of a corresponding limitation in communication channels. Embodiments of the present disclosure provide, among other things, free-space communication systems comprising displays with greater frame and data rates providing increased bandwidth.

Figure 1C:
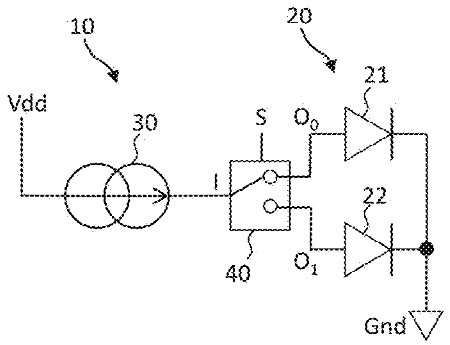
Figure 1B:
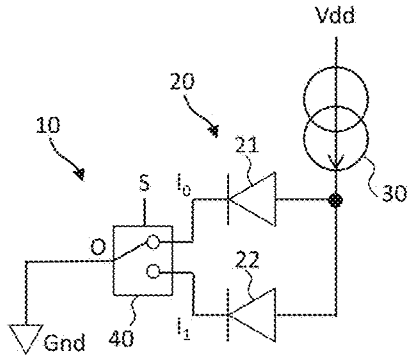

According to some embodiments of the present disclosure and as shown in FIGS. 1A-1C, a current-steering circuit 10 useful in a display comprises a first current load 21, a second current load 22, a current source or current sink 30, and a current-steering switch 40. Current-steering switch 40 can be operable to electrically connect first current load 21 to current source or current sink 30 in a first switch mode to direct electrical current from current source 30 through first current load 21 and can be operable to electrically connect second current load 22 to current source or current sink 30 in a second switch mode different from the first switch mode to direct electrical current from current source 30 through second current load 21. In some embodiments, current-load control circuit 10 is a current-steering circuit 10.

When power is applied to a current load 20, electrical current passes through current load 20, transforming electrical power to another form of energy, for example light or heat. The present disclosure refers to components as current loads 20 even when power is not being actively applied to current load 20. Thus, even if no power is being provided to current-steering circuit 10, current-steering circuit 10 still comprises first and second current loads. Similarly, even if no power is being applied to a light emitter and the light emitter is not, therefore, emitting light, it is still considered a current load (e.g., a light emitter) herein. Moreover, if no power is being applied to current-steering switch 40 and current-steering switch is not actively switching or conducting electrical current, it is still considered a current-steering switch 40 herein.

As shown in FIGS. 1A and 1B, first current load 21 is a light emitter and second current load 22 is a light emitter. The light emitters can be inorganic light emitters and can be micro-inorganic-light emitters, for example having a length or width no greater than one hundred microns, no greater than fifty microns, no greater than twenty microns, no greater than ten microns, no greater than five microns, no greater than two microns, or no greater than one micron, that can be micro-transfer printed from a source wafer. Light emitters can be light-emitting diodes, lasers, diode lasers, or vertical-cavity surface-emission lasers. First and second current loads 21, 22 are, in some cases, collectively referred to as current loads 20.

Current loads 20 can be electronic devices that use electrical current provided across a voltage differential to perform a function, such as light emission or simply to sink (load) electrical current without emitting light. Current source or current sink 30 can be an electronic circuit that sources or sinks current, for example a current suitable for causing the light emitters to emit light at a desired luminance, for example at a desired efficiency. In the following description, current source or current sink 30 is referred to for brevity as a “current source 30” and with an arrow indicating the direction of current flow in the figures. That is, as will be clear from context, references to “current source 30” (which may be a constant-current source 30) herein may actually be referring to a current sink 30 or, alternatively, may generically refer to a component that could be a current source or a current sink 30. Unless otherwise clear from context, as will be appreciated by those of ordinary skill in the art, for any embodiment described as using a current source 30, an analogous embodiment using a current sink 30 is also contemplated.

Current source 30 can be an electronic circuit, for example formed using photolithography on a semiconductor integrated circuit. Current-steering switch 40 can likewise be an electronic circuit, for example formed using photolithography on a semiconductor integrated circuit. The semiconductor integrated circuit can be a silicon or compound semiconductor circuit. Current-steering switch 40 and current source 30 can be provided in a common integrated circuit. Current loads 20 such as light emitters can be disposed on or in the common integrated circuit. Current loads 20 can be electrically connected with electrical conductors such as wires to current source 30 or current-steering switch 40, for example formed using photolithography in an integrated-circuit fab or clean room.

FIG. 1A illustrates embodiments in which both first and second current loads 21, 22 are light-emissive light emitters (e.g., LEDs). The light emitters can emit different colors of light and can have different spatial locations in current-steering circuit 10. A voltage source (e.g., Vdd) is applied to the light emitters (first and second current loads 21, 22). First current load 21 is electrically connected to an input of current-steering switch 40 (e.g., $I_0$) with a wire and second current load 22 is connected to another, different input of current-steering switch 40 (e.g., $I_1$) with a wire. Responsive to a switch-control signal S, current-steering switch 40 selects one of inputs I (e.g., selects a switch mode corresponding to selecting one of inputs $I_0$ or $I_1$, collectively inputs I) and electrically connects the selected input I to an output O. Output O is connected to current source 30 and then to ground with electrical conductors (e.g., metal wires). In operation, current can flow from Vdd (e.g., an electrical voltage supplied to operate current-steering circuit 10 through one of first and second current loads 21, 22 depending on the selected current-steering switch setting S, through current-steering switch 40 to current source 30 and thence to a ground connection Gnd. Electrical current can substantially or effectively flow through only one current load 20 at any moment, although limitations in circuit components, design, and manufacturing can limit this capability during the switching process and more generally when current-steering circuit 10 is in use. Thus, preferably current flows through only one current load 20 at a time, but some stray or parasitic current can flow through one or more other current loads at the same time.

As shown in FIG. 1B, current source 30 can be electrically connected on a side of current loads 20 opposite current-steering switch 40. In general, current loads 20 are disposed and electrically connected between current source 30 and current-steering switch 40 and electrical current can flow through current loads 20 and current-steering switch in either direction depending on circuit design and component orientation in current-steering circuit 10.

The input I and output O labels of current-steering switch 40 are arbitrary and, in some embodiments and as shown in FIG. 1C, electrical current can flow in an opposite direction through current-steering switch 40 depending on the circuit and component configuration and design of current-steering switch 40. The direction of current flow through current-steering switch 40 can be independent of the switch inputs I and switch output O. Thus, in some embodiments current-steering switch 40 can enable electrical current from output O to a selected one of inputs I. Alternatively, inputs I and output O of current-steering switch 40 can be relabeled, for example with one input I and multiple outputs O (e.g., $O_0$, $O_1$).

As shown in FIG. 1C, both first and second current loads 21, 22 can be light emitters, e.g., light-emissive light-emitting diodes (LEDs), lasers, diode lasers, or vertical-cavity surface-emission lasers (VCSELS). The light emitters can emit different colors of light. A voltage source (e.g., Vdd) is applied to current source 30 that provides current to input I of current-steering switch 40. Responsive to switch-control signal S, current-steering switch 40 electrically connects input I to one of multiple outputs O. Each of outputs O is connected to a current load 20, for example $O_0$ can be connected to first current load 21 and $O_1$ can be connected to second current load 22. Current loads 20 can then be connected to a ground.

Figure 2:
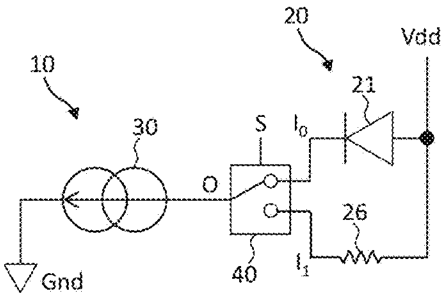
FIG. 2 is a schematic diagram of a current-steering circuit with two inputs comprising a non-emissive load according to illustrative embodiments of the present disclosure.

In some embodiments and as shown in FIG. 2, one of current loads 20 is a non-emissive current load 26. Non-emissive current load 26 does not emit detected light when electrical current passes through non-emissive current load 26. Non-emissive current load 26, e.g., a resistor, can be chosen so that a voltage drop across non-emissive current load 26 matches that of a current drop over an emissive current load 20, thereby ensuring that the current flow through current loads 20 matches the current flow through non-emissive current load 26 when current is switched through the respective current load 20, 26, maintain a static current flow through current-steering circuit 10.

Figure 3A:
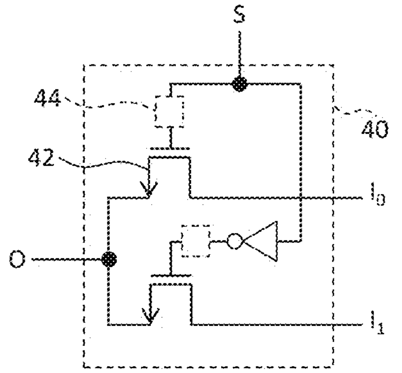
FIGS. 3A and 3B are schematic diagrams of current-steering switches with two inputs according to illustrative embodiments of the present disclosure.
Figure 3B:
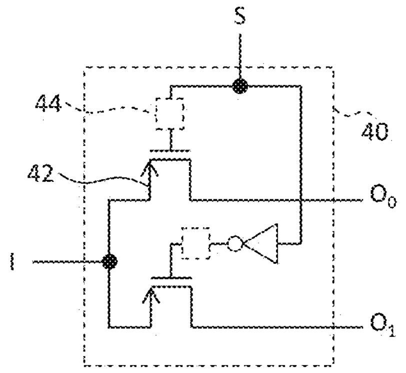

FIGS. 3A and 3B illustrate current-steering switch 40 embodiments according to the present disclosure that switch two inputs I (e.g., $I_0$, $I_1$ to a common output O in response to a switch-control signal S. As shown in FIG. 3A, switch-control signal S is applied to the gate of a first current-steering transistor 42 (e.g., a field-effect transistor, or FET, such as a metal-oxide semiconductor field-effect transistor (MOSFET), in this example an nMOS FET where the arrow indicates the direction of current flow) whose source is electrically connected to an input $I_0$ and drain is connected to output O. An inverted version of switch-control signal S is also applied to the gate of a second current-steering transistor 42 (e.g., a field-effect transistor) whose source is electrically connected to an input $I_1$ and drain is commonly connected to output O. Inputs I can be electrically connected to current loads 20 (not shown in FIGS. 3A and 3B). In operation, the current-steering transistor 42 that is enabled (selected) by switch-control signal S is turned on and electrically connects the corresponding input I to the output O, for example as illustrated in FIGS. 1A and 2. Because each of a positive and negative version of a common switch-control signal S is applied to a different current-steering transistor 42, one of the different current-steering transistors 42 is always turned on and electrical current is substantially or effectively always passing through a current load 20, within design, component, and manufacturing limitations of current-steering circuit 10. Flipping the polarity of the signal will flip which of the different current-steering transistors 42 is on.

As shown in FIG. 3B, switch-control signal S is applied to the gate of a first current-steering transistor 42 (e.g., a field-effect transistor in this example a pMOS FET where the arrow indicates the direction of current flow) whose drain is electrically connected to an input $I_0$ and source is connected to output O. An inverted version of switch-control signal S is applied to the gate of a second current-steering transistor 42 (e.g., a field-effect transistor) whose drain is electrically connected to an input $I_1$ and source is commonly connected to output O. In operation, the current-steering transistor 42 that is enabled (selected) by switch-control signal S is turned on and electrically connects the corresponding input I to the output O, for example as illustrated in FIG. 1B.

The current-steering transistors 42 in FIGS. 3A and 3B can be connected to current loads 20 and can form a differential pair of transistors, for example controlled by differential signals such as positive and negative versions of switch-control signal S. Either the sources or drains of the current-steering transistors 42 in the differential pair can be electrically connected in common to provide a common input or output for the differential pair and the other of the sources or drains provide a separate input or output connected to separate current loads 20.

Figure 4:
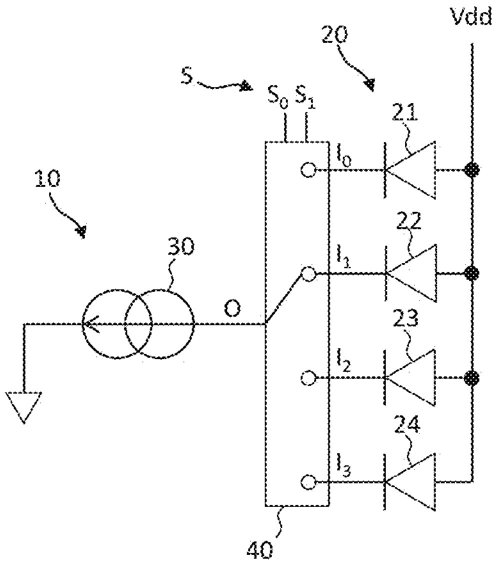
FIG. 4 is a schematic diagram of a current-steering circuit with four inputs according to illustrative embodiments of the present disclosure.

In some embodiments and as shown in FIG. 4, current-steering switch 40 can switch between more than two inputs I, for example three, four (as shown in FIG. 4), five, six, seven, or eight different inputs I, and connect each input I (when selected) to a common output O. Each input I is connected to a current load 20 (e.g., current loads 21, 22, 23, 24) so that current-steering switch 40 can switch between any of current loads 20 in response to switch-control signal S, in this case having multiple binary bits $S_0$, $S_1$ (collectively switch-control signal S) to select from the more-than-two inputs I.

Figure 5A:
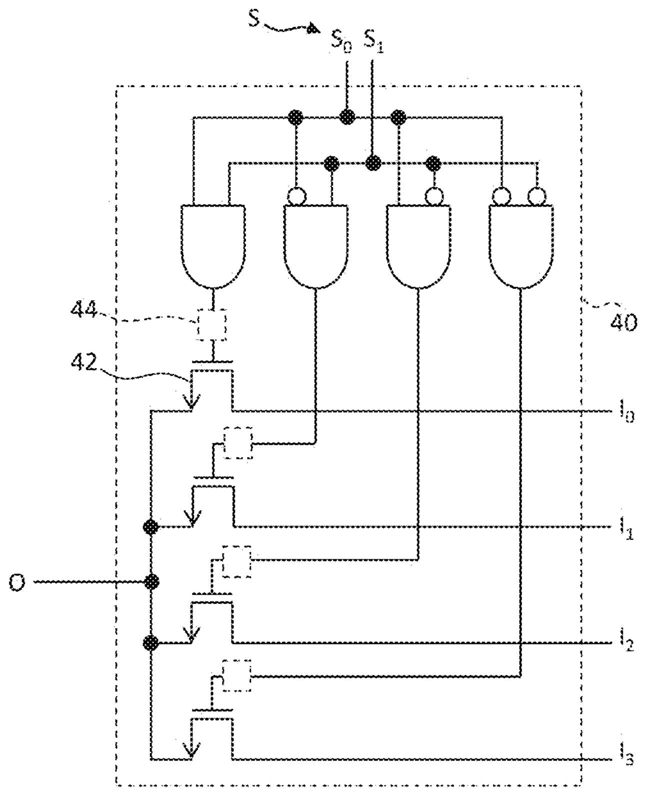
FIGS. 5A and 5B are schematic diagrams of a current-steering switch with four inputs according to illustrative embodiments of the present disclosure.

FIG. 5A illustrates current-steering switch 40 corresponding to the FIG. 4 four-input illustration. Each input I is connected to an nMOS FET current-steering transistor 42 whose gate is connected to a control signal derived from switch-control signal S. In this illustration, the two-bit switch-control signal $S_0$, $S_1$ selects one of four switch inputs $I_0$, $I_1$, $I_2$, $I_3$ by combining inverted and non-inverted versions of the two bits with AND gates, where each two inputs of the AND gates is a unique combination of the possible values of two bits, e.g., forming a demultiplexer. The AND gates and inverters can comprise very small logic transistors, e.g., digital binary transistors that operate on very little current, switch very quickly, and therefore have little effect on the dynamic current performance of current-steering circuit 10. The outputs of the current-steering transistors 42 are connected in common to output O. In operation, current-steering transistor 42 selected by switch-control signal S turns on to connect a corresponding input I to output O. Those knowledgeable in digital circuit design will understand that an equivalent four-input circuit can be constructed corresponding to FIG. 3B. Moreover, current-steering switch 40 is not limited to the embodiments illustrated here; the present examples are provided to aid understanding of the function of current-steering switch 40.

Figure 5B:
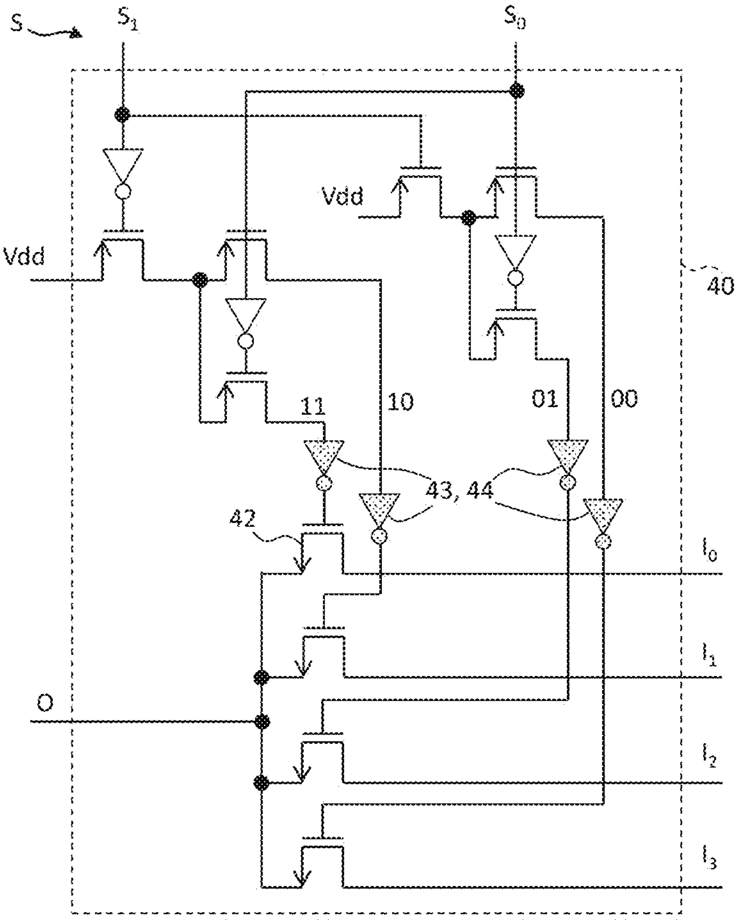

FIG. 5B illustrates a hierarchical (multi-level) current-steering switch 40 corresponding to the FIG. 4 four-input illustration comprising multiple successive levels of the hierarchy through which control signals propagate. Each successive level is twice as large as the previous level (has twice as many components or logic transistors) and has a common connection that inputs signals from the separate connections in the previous level. Each input I is connected to a current-steering transistor 42 whose gate is connected to a control signal derived from switch-control signal S. In this illustration, the two-bit switch-control signal $S_0$, $S_1$ selects one of four switch inputs $I_0$, $I_1$, $I_2$, $I_3$ by first forming a control signal corresponding to each of the possible values (e.g., zero and one) of one of a first bit (e.g., $S_1$) and then, for each of the possible values of the first bit, forming a control signal corresponding to each of the possible values (e.g., zero and one) of a second bit (e.g., $S_0$). The design can be extended to any number of bits in S by hierarchically forming a control signal corresponding to each of the possible values (e.g., zero and one) of each of the bits in S. Each control signal is then applied to the gate of a current-steering transistor 42 to select a current-steering transistor 42. In FIG. 5B, each control signal is labeled with the corresponding bit combination facilitating the control signal.

The control signals can be formed using logic transistors whose gates are controlled by a switch-control signal S or its inverse, thereby forming a differential transistor pair. A first level can comprise one differential transistor pair, the next level can comprise two differential transistor pairs, the next level can comprise four differential pairs, and so on, doubling the number of differential transistor pairs at each successive level. Logic transistors can comprise very small CMOS transistors, e.g., digital binary transistors that operate on very little current, operate very fast, and therefore have little effect on the dynamic current performance of current-steering circuit 10. The outputs of the last stage of logic transistors in the hierarchy can be connected to the gates of reduced-voltage gate drivers 43 that control current-steering transistors 42. In some embodiments, the outputs of the last stage of logic transistors in the hierarchy can be connected directly to current-steering transistors 42. In operation, current-steering transistor 42 selected by switch-control signal S turns on to connect a corresponding input I to output O. Those knowledgeable in digital circuit design will understand that an equivalent four-input circuit can be constructed corresponding to FIG. 3B. Moreover, current-steering switch 40 is not limited to the embodiments illustrated here; the present examples are provided to aid understanding of the function of current-steering switch 40.

Thus, in embodiments of the present disclosure, a current-steering circuit 10 (or current-steering switch 40) can be responsive to a multi-bit switch-control signal S comprising control bits. Current-steering switch 40 can comprise multiple selection levels, each selection level twice as large (e.g., has twice as many components or logic transistors) as the previous level. A first level can comprise a differential pair of logic transistors controlled by a first control bit of the multi-bit switch-control signal S providing the switch-control signal for the first level. Successive levels of differential pairs of logic transistors are each controlled by a different control bit of the multi-bit switch-control signal S providing the switch-control signal for the level. Each differential pair of logic transistors in the level is connected in common to a separate connection of the previous level of the successive levels and a differential pair of logic transistors can be (but is not necessarily) connected to each separate connection of the logic transistors of the previous level of the successive levels. The separate connections of the final level of the successive levels controls the current flow through current-steering transistors 42 and current loads 20, e.g., through a reduced-voltage gate driver 43.

According to embodiments of the present disclosure, current source 30 takes some time and energy to provide the desired amount of current when power is first applied to the current source 30 circuit. Moreover, when power is first applied to current source 30, electrical current must pass from a remote power supply to current source 30 and thence to a ground. Since electrical connections (wires) connected to current source 30 from power and ground sources have some resistance, the current flow will produce energy losses. Moreover, capacitive and inductive parasitic energy losses can occur with the current flow, resulting in a practical limitation on switching rates. This energy loss and switching rate limitation also can occur when current source 30 switches on and off, for example when current source 30 supplies current to a current load 20 and then stops supplying current to current load 20, in some embodiments limiting the switching rate for micro-amp current sources 30 at approximately ten MHz.

According to embodiments of the present disclosure, current-steering switch 40 substantially or effectively prevents current source 30 from activating and deactivating (e.g., turning on and off). Thus, current source 30 can be a substantially or effectively a constant-current source (or sink) 30. Current source 30 requires an initial start-up (power-up) time and thereafter substantially or effectively provides electrical current at a fixed current and voltage over time. Thus, there is substantially little or no dynamic power use (changes in power use), reducing parasitic overhead in the power provided to current source 30, and only a substantially or effectively static power use (a substantially or effectively constant power use). Thus, embodiments of the present disclosure provide reduced power use and improved switching rates, especially where the switching rates exceed the switching time for current source 30, for example at least one MHz, at least ten MHz, or more (e.g., at least 100 MHz, or at least 1 GHz) (e.g., and no more than 10 GHz).

In embodiments of the present disclosure and to maintain a static power flow in current-steering circuit 10, whenever a first current-steering transistor 42 switches on, a second current-steering transistor 42 switches off so that current flow from current source 30 is consistently and constantly maintained with substantially or effectively no variation. To enable substantially simultaneous switching between first and second current-steering transistors 42, an optional switch synchronizer 44 circuit (as shown in FIGS. 3A, 3B, 5A, and 5B can control the voltage and timing of current-steering switch 40 operation, for example by using a suitable delay circuit, if necessary or desired to ensure that the gate control signal arrives at the gate of first current-steering transistor 42 and arrives at the gate of second current-steering transistor 42 at substantially or effectively the same time, for example by controlling wiring length or adding transistor amplifiers as needed between switch-control signal S and the gates, for example where the number of logic transistors controlling current-steering transistor 42 gates is different. A switch synchronizer 44 circuit can also provide intermediate voltages for controlling current-steering transistors 42, e.g., with a reduced-voltage gate driver 43. Current-steering transistors 42, demultiplexer and switch synchronizers 44 can be made using conventional logic, for example in a silicon or compound semiconductor integrated circuit made using photolithography in a fab.

Figure 6B:
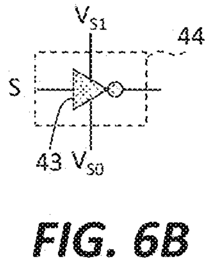
FIG. 6B is a schematic diagram of a switch synchronizer and reduced voltage transistor according to illustrative embodiments of the present disclosure.
Figure 6A:
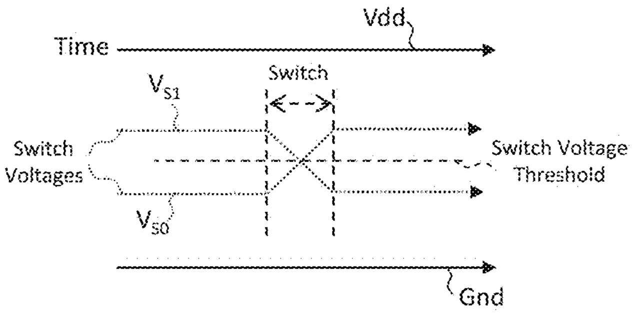
FIG. 6A is a schematic diagram of switch voltages for a current-steering switch according to illustrative embodiments of the present disclosure.

FIG. 6A illustrates embodiments of switching current-steering switch 40 corresponding to FIGS. 1A-3B and 5A-5B. As shown in FIG. 6A, a current-steering circuit 10 can have a relatively constant power (Vdd) signal and ground (Gnd) signal providing substantially or effective static electrical power to the circuit (e.g., the power provided to current-steering circuit 10 does not vary significantly over time). This constant power reduces energy losses due to dynamic changes in current flow and reduces parasitic losses (e.g., capacitive and inductive losses) that can limit current-steering circuit 10 switching rates.

Voltages applied to the gates of transistors 42 in current-steering switch 40 can be equal to the power and ground voltages (Vdd volts and Gnd or zero volts). However, in some embodiments and as shown in the voltage diagram of FIG. 6A and the circuit diagrams of FIGS. 6B and 5B, current-steering transistors 42 can have a reduced switching voltage (switch voltage threshold) between circuit operating voltages (e.g., voltages applied to the light emitters, current source 30, or logic transistor gates) and, by using intermediate voltages (switch voltages $V_{S0}$ and $V_{S1}$) between the circuit operating voltages to control the current-steering transistor 42 gate, voltage swing on the current-steering transistor 42 gate is reduced, thereby reducing the power and time to switch current-steering transistor 42 and increasing the switching rate of current-steering transistor 42 (e.g., faster current-steering transistor 42 switching).

FIG. 6A shows both a switch turning from on to off and a switch turning from off to on. A common reduced switch voltage threshold from turning from on to off and turning from off to on is shown, but in some embodiments, hysteresis can be present and the switch voltage threshold for a switch turning off can be different from a switch voltage threshold for a switch turning on. Regardless, in some embodiments, the switch voltages can be between the switch voltage threshold(s) and the circuit operating voltages (the voltage rails).

Such intermediate voltages can be provided externally to current-steering circuit 10 (as shown in FIGS. 5B and 6B) or generated internally to current-steering circuit 10 (not shown in the Figures). In some embodiments, switch-control signal S can be a control signal using $V_{S0}$ and $V_{S1}$, for example where the signal is directly applied to the gate of current-steering transistor 42, for example as shown in FIGS. 1-3B. In some embodiments, inverted signals, AND gates, or demultiplexers (as in FIGS. 5A and 5B) could also use such a voltage dynamic range to provide a reduced voltage range control signal applied to the gates of current-steering transistors 42. In some embodiments, logic transistors of the AND gates, inverters, or demultiplexers can use a control voltage as applied, for example, to the light emitters and current source 30 but switch the reduced-range intermediate voltages $V_{S0}$ and $V_{S1}$.

FIG. 6B illustrates a switch synchronizer 44 comprising a reduced-voltage gate driver 43 with a gate controlled by switch-control signal S of any suitable voltage for switching reduced-voltage gate driver 43. Reduced-voltage gate driver 43 (e.g., an inverter comprising one or more transistors) is shown with a darker fill to distinguish it from logic transistors used elsewhere in current-steering circuit 10. Power at a $V_{S1}$ voltage and a ground corresponding to $V_{S0}$ can be applied to reduced-voltage gate driver 43 so that the output of reduced-voltage gate driver 43 has a reduced range (voltage swing) even if the input voltage has a Vdd or zero voltage. In operation, if reduced-voltage gate driver 43 receives a logical one (e.g., equal to Vdd), the $V_{S0}$ voltage is output and applied to the gate of current-steering transistor 42. If reduced-voltage gate driver 43 receives a logical zero (e.g., equal to ground), the $V_{S1}$ voltage is output and applied to the gate of current-steering transistor 42. Thus, switch synchronizer 44 can provide a gate-control signal for current-steering transistors 42 having a reduced voltage range, reduced power usage, and shorter switching time, since voltage swing from off to on and vice versa is reduced.

In another interpretation of FIG. 6A, one of the switch voltage lines can represent the voltage applied to a first current-steering transistor 42, for example switching from on to off, and the other of the switch voltage lines can represent the voltage applied to a second current-steering transistor 42, for example switching from off to on. Ideally, first and second current-steering transistors 42 cross the switch voltage threshold at the same moment so that electrical current continues flowing during the switch operation, but switches paths and current loads 20. However, manufacturing variations can vary the exact switching time of the reduced-voltage gate drivers 43 or current-steering transistors 42. Despite these possible differences, in various embodiments current-steering switch 40 can effectively or substantially reduce power usage and switching time.

According to some embodiments of the present disclosure, current loads 20 are substantially or effectively the same or similar (e.g., within manufacturing tolerances), current-steering transistors 42 are substantially or effectively the same or similar (for example have a substantially or effectively same size) and have substantially or effectively the same performance characteristics. However, due to component and manufacturing differences, switching for different current-steering transistors 42 might not be perfectly simultaneous. In some embodiments, the switch time of current-steering transistors 42 is so fast (e.g., less than one nanosecond or pico-seconds) that the effect of slightly different switching times for current-steering transistors 42 on the dynamic current flow for current source 30 is negligible so that no switch synchronizer 44 is necessary, or only reduced-voltage gate drivers 43 are used.

Figure 7:
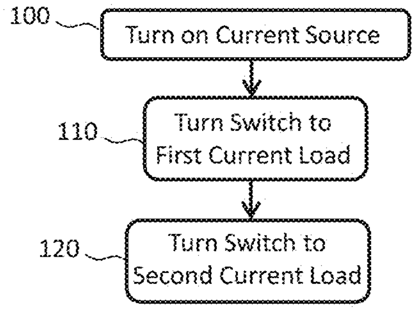
FIG. 7 is a flow diagram for operating a current-steering circuit according to illustrative embodiments of the present disclosure.

FIG. 7 is a flow diagram illustrating the operation of current-steering circuit 10 and the switching of current-steering switch 40. In step 100, current source 30 is turned on, for example power is supplied to current source 30 when current-steering circuit 10 is enabled. Current flow in current-steering circuit 10 can take a relatively long time to stabilize into a steady state (e.g., relatively little dynamic electrical current flow is present). Once stable, in step 110 current-steering switch 40 can switch into a first switch mode in response to switch-control signal S, thereby providing electrical current to a first current load 21, for example to emit light from a first light emitter. In step 120, current-steering switch 40 can switch into a second switch mode in a relatively shorter time providing electrical current to a second current load 22, for example in response to a change in switch-control signal S to emit light from a second light emitter or to a non-emissive current load 26, thus optically communicating information with current loads 20. Current source 30 can substantially or effectively continue providing a constant electrical current in current-steering circuit 10 despite the change in switch-control signal S, reducing dynamic current flows and energy losses and increasing the speed at which current loads 20 can switch and thereby increasing the data rate of information that can be communicated with current loads 20, e.g., by turning light emitters on and off.

Figure 8:
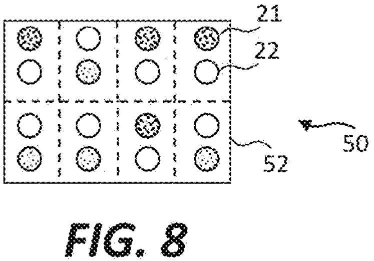
FIG. 8 is a schematic diagram of a display comprising pixels having pairs of spatially separated light emitters in different locations on a display substrate according to illustrative embodiments of the present disclosure.
Figure 9:
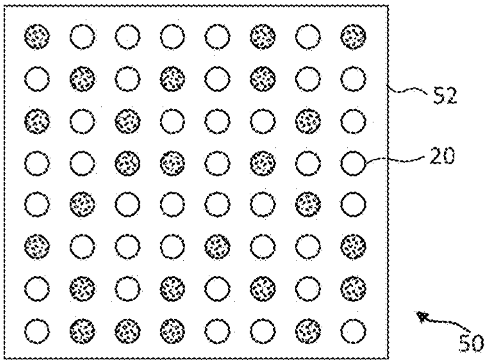
FIG. 9 is a schematic diagram of a display comprising light emitters on a display substrate according to illustrative embodiments of the present disclosure.
Figure 10:
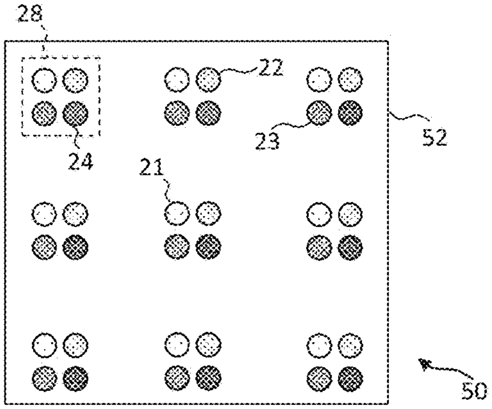
FIG. 10 is a schematic diagram of a display comprising pixels having four light emitters that emit different colors of light on a display substrate according to illustrative embodiments of the present disclosure.

In FIGS. 8-10, circles represent LEDs (e.g., micro-light-emitting diode light emitters). Circles without a fill represent an LED in an OFF state, circles that are filled in represent an LED in an ON state, and different amounts of fill represent different colors of light emitted by an LED in an ON state. In the embodiments of FIGS. 1A and 1B, current-steering switch 40 will select one of two spatially separated LEDs (current loads 20) and the selected LED will emit light in response to the electrical current passing through the LED, as shown in FIG. 8. Information can be communicated with the LEDS by detecting which of the spatially separated LEDs emits light. The LEDs can emit different colors of light. In some embodiments and as also shown in FIG. 8, the LEDs can emit a common color of light and the position of the light emitter can correspond to a signal, for example a first location of an LED corresponds to a first value (e.g., a one) and a second location of an LED can correspond to a second value (e.g., a zero).

In embodiments such as those illustrated in FIG. 2 having a non-emissive current load 26, information can be communicated with the LED by detecting whether the LED emits light, as shown in FIG. 9.

In embodiments in which the LEDs emit different colors (frequencies) of light, the information can be determined by detecting the color of light. For example, if a first LED (first current load 21) in a display pixel 28 emits blue light and a second LED (second current load 22) in display pixel 28 emits green light, the two colors can correspond to a binary signal (e.g., blue equals one and green equals zero), for example as shown in FIG. 10. In some related embodiments, one of the LEDs (as in FIGS. 1A and 1B) can emit a color of light that is not sensed by a detector (e.g., an infrared- or ultraviolet-light-emitting LED emitting light not visible to the human visual system or an LED that emits a visible light that is not detected by the detector, for example an image detector that only detects one color of light, for example using a color filter to filter out the undetected colors of light). In such embodiments, the detection of light and the absence of detected light can also provide a binary signal, for example detection corresponding to a one and an absence corresponding to a zero, as in FIG. 9 but using the display pixel 28 arrangement of FIG. 10.

In some embodiments, and as shown in FIG. 10, current-steering circuit 10 can comprise more than two current loads 20, for example four current loads 20. Each current load 20 can be an LED and each LED can emit a different color of light. The LEDs controlled by a common current-steering switch 40 can be or form a display pixel 28. The color of light emitted by display pixel 28 can encode information; in this illustration four colors (or three colors and black (e.g., using non-emissive current load 26) can encode two bits of information in each display pixel 28. Display pixels 28 can have any number of current loads 20 (for example all, at least some, or all but one of which are light emitters), including one, two, three, or four.

Figure 11:
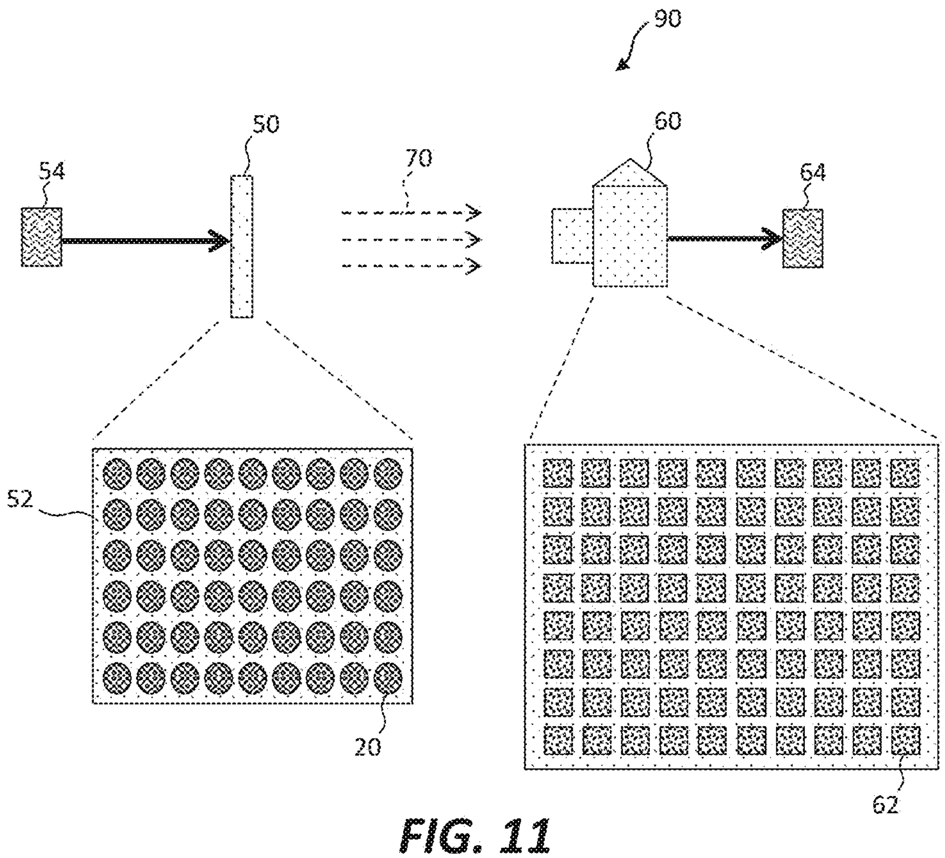
FIG. 11 is a schematic diagram of an optical communication system comprising a display and an image detector according to illustrative embodiments of the present disclosure.

Embodiments of the present disclosure and as illustrated in FIGS. 8-10 can comprise a display 50 comprising display pixels 28 disposed on a display substrate 52, for example arranged in an array over display substrate 52. Each display pixel 28 can comprise a current-steering circuit 10, for example including current loads 20 or light emitters and current-steering switch 40, disposed on or over a display substrate 52. Each current load 20 can be disposed on a different location on display substrate 52. Each display pixel 28, light emitter, or pairs of current loads 20 can encode and display information (e.g., a display image 54) on display 50 that can be transmitted to a display detector, e.g., an image detector 60 disposed and operable to capture an image of display 50 and record the captured image as a recorded image 64, as shown in FIG. 11. In some embodiments, a single current source 30 can be disposed externally to display pixels 28 and provide electrical current to current loads 20 in display pixels 28. In some embodiments, each display pixel 28 can comprise a single current source 30 disposed internally to display pixel 28 and provide electrical current to current loads 20 in display pixel 28.

FIG. 11 illustrates an optical communication system 90 comprising a display image 54, for example a binary image, received by and displayed on (e.g., shown on) display 50. Display 50 emits light 70 with light emitters (e.g., emits light from current loads 20 in display pixels 28) corresponding to the image pixels in the binary image. Light 70 from display 50 is captured by camera pixels 62 in an image detector 60. Image detector 60 can be spatially remote from display 50 and can be in a line-of-sight from display 50 so that information encoded in display image 54 is optically communicated from display 50 to image detector 60. As used herein, direct line-of-sight is a path through space traversed by a beam of light without redirection or obstruction. A direct-line-of sight can be a line through space traveled by a light ray, for example a visual axis or sightline, that is only curved due to gravity or refraction.

The captured image can be optionally processed with an image processor and recorded as a recorded image 64 and output from optical communication system 90. Recorded image 64 can be analyzed, for example with a computer, to decode information in display image 54, for example by detecting the presence or absence of light 70 emitted by display pixels 28 in display 50, by detecting the position of light-emitting LEDs in display pixels 28, or by detecting the color of light-emitting LEDs in display pixels 28.

Figure 12:
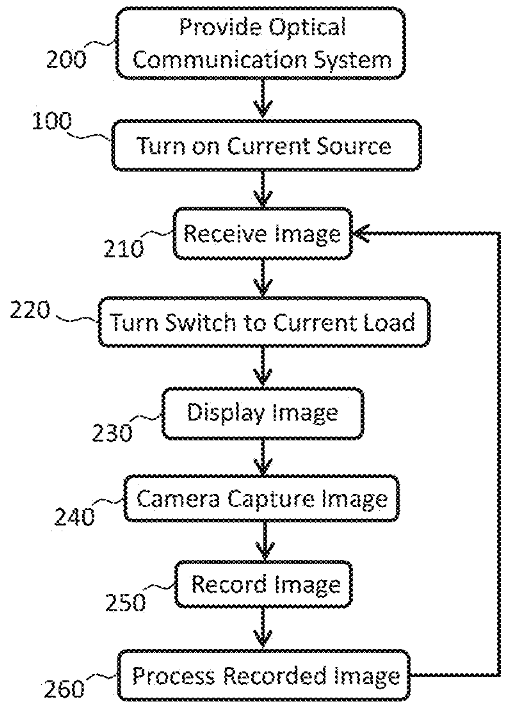
FIG. 12 is a flow diagram for operating an optical communication system according to illustrative embodiments of the present disclosure.

FIG. 12 illustrates the operation of optical communication system 90. Optical communication system 90 is provided in step 200 and current source 30 is turned on (e.g., initialized during a boot or power-on process) in step 100. A display image 54 (e.g., a binary image or digital image having an array of image pixels encoding information) is received by display 50 in step 210. Responsive to values of the image pixels in the image array, a selected current load 20 in each of an array of display pixels 28 corresponding to the image pixels is turned on by current-steering switch 40 with switch-control signal S in each current-steering circuit 10 of each display pixel 28 in step 220 to show display image 54 on display 50 and emit light 70 in step 230. For example, a pixel value of zero can correspond to a first current load 20 and a pixel value of one can correspond to a second current load 20. Step 220 (controlling current-steering switch 40) and step 230 (showing display image 54 on display 50 in step 230) can be essentially or effectively the same step. After step 230, image detector 60 can capture light 70 emitted from display 50 to provide a captured image in step 240. The captured image can be optionally processed and then recorded in step 250, for example for subsequent processing, analysis, and decoding in step 260. The steps can then repeat by receiving another display image 54 in step 210. Because current-steering switch 40 can quickly switch current loads 20 (e.g., selecting different light emitters to emit light) without turning current source 30 on or off, the steps can iterate very quickly, for example a different display image 54 can be displayed every one millisecond, one hundred microseconds, ten microseconds, one microsecond, one hundred nano-seconds, every ten nano-seconds, or every one nanosecond, for example corresponding to a frame rate of one kHz, ten kHz, one hundred kHz, one MHz, ten MHz, one hundred MHz, or one GHz, a rate that is difficult to achieve with a conventional current source and on-off switch design. Thus display 50 can be a high-frame-rate display 50 or a high-frame-rate backlight used for optical communication.

Figure 13:
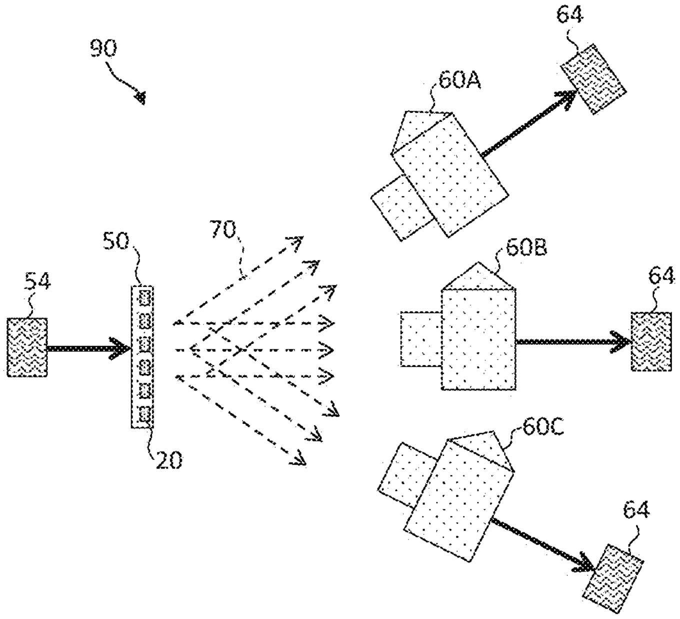
FIG. 13 is a schematic diagram of an optical communication system comprising multiple image detectors according to illustrative embodiments of the present disclosure.

In some embodiments and as illustrated in FIG. 13, current loads 20 in each display pixel 28 of display 50 can comprise two or more light emitters that each emit a different color of light. Display images 54 having display pixels 28 that each specify a different color of light can be displayed on display 50 and captured by a plurality of image detectors 60 disposed and operable to capture images displayed on display 50. Each image detector 60 can be responsive to a different color of light. In this way, display 50 can communicate information to multiple different image detectors 60 in an optical communication system 90. For example, display 50 can comprise display pixels 28 that emit red, green, blue, or optionally invisible light or no light or light that cannot be recorded by an image detector. Each of image detectors 60A, 60B, 60C can be responsive to a different color of light. Display 50 can, for example, sequentially provide a red and black image, a green and black image, and a blue and black image with display pixels 28 to sequentially communicate to each of image detectors 60A, 60B, 60C in turn. (Such a display 50 can include pixels 28 that each have four current loads 20 (red, green, blue, and non-emissive) that are switched among with a current-steering switch 40 to facilitate displaying such display images in sequence.) Thus, according to embodiments of the present disclosure, display 50 can be a color sequential display 50 that can operate at very high frame rates, for example no less than 600, 1,000, 2,000 5,000, 10,000, 20,000, 50,000, 100,000, 1,000,000, 100,000,000, 1,000, 000,000, or 10,000,000,000 frames per second.

Display 50 can comprise any useful display substrate 52 on which display pixels 28 are disposed, for example glass or plastic substrates found in the display or integrated circuit industry. Current loads 20 or light emitters can be disposed on display substrate 52 by micro-transfer printing and can comprise broken (e.g., fractured) or separated tethers. Display pixels 28 are typically arranged in a regular array (e.g., a two-dimensional array in rows and columns) but can be disposed in any useful arrangement that can be captured by image detector 60. Each display image 54 displayed by display 50 can be an image frame (e.g., frame) and the number of different display images 54 that can be displayed per unit of time by display 50 is the display frame rate. According to embodiments of the present disclosure, display 50 can operate at higher frame rates with light emitters that can switch on and off faster, for example light-emitting diodes, and displayed images 54 can be more readily detected with light emitters (e.g., current loads 20) that are relatively bright, such as inorganic light emitting diodes, for example inorganic micro-light emitters (micro-iLEDs), that can switch at very high rates. The color of light 70 emitted by iLEDs of the present disclosure can be a color that is most or desirably efficient for an iLED to emit and current source 30 can be adapted to provide a current that operates the iLED at a desirably efficient current density. (As used herein, light 70 refers to electromagnetic radiation that is emitted by display 50 or is captured by image detector 60 and does not refer only to human-visible light. For example, infrared or ultraviolet light can be used.)

Image detector 60 can be any camera capable of digitally capturing and recording an image from display 50 with an array of camera pixels 62, each camera pixel 62 operable to record a portion of an image exposed onto the array of camera pixels 62, e.g., with an optical imaging system comprising one or more lenses. Image detector 60 can have more camera pixels 62 than display 50 has display pixels 28 so that image detector 60 can record each of display pixels 28 with at least one and optionally multiple camera pixels 62. Image detector 60 can be a black-and-white camera, can be responsive to only a single color of light 70, or can be a color camera responsive to different colors of light 70 to record a color image. In some embodiments, camera pixels 62 each comprise a single light detector (such as a CCD or CMOS photodetector or light sensor) responsive to light 70 or responsive to a color of light 70. In some embodiments, camera pixels 62 each comprise multiple light detectors (such as CCD or CMOS photodetectors or light sensors) each responsive to a different color of light 70 (for example are exposed to light through different color filters). The multiple light detectors in a single camera pixel 62 can be closer together or no farther apart than any two light detectors that detect the same color of light 70 in different camera pixels 62. In some embodiments, multiple light detectors in a single camera pixel 62 are responsive to a same color of light 70 (e.g., have no color filters or all have the same color filter), for example to provide redundant or more sensitive detection of a common color of light 70 and improve the signal-to-noise ratio of light 70 detected by camera pixel 62. In some embodiments, image detector 60 detects only white light 70, only green light 70, only infrared light 70, only blue light 70, or only ultraviolet light 70.

In some embodiments, image detector 60 can capture an image of display 50, process the captured image, and analyze the processed image to decode the processed image. In some embodiments, image detector 60 has an image capture (recording) frame rate equal to or greater than a display frame rate of display 50 (e.g., a camera frame rate equal to or faster than a display frame rate at which display 50 receives and displays display images 54, e.g., at least one and a half times as fast or at least twice as fast).

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific elements, or where processes and methods are described as having, including, or comprising specific steps, it is contemplated that, additionally, there are apparatus and systems of the disclosed technology that consist essentially of, or consist of, the recited elements, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular reference to certain embodiments thereof, but it will be understood that variations and modifications can be effected within the spirit and scope of the disclosure.

PARTS LIST $I_0$, $I_1$, $I_2$, $I_3$ switch input
S, $S_0$, $S_1$ switch-control signal
$V_{S0}$, $V_{S1}$ switch voltage
O switch output
S switch-control signal
10 current-steering circuit
20, 21, 22, 23, 24 light-emitter/current load/light-emitting diode
26 non-emissive current load
28 display pixel
30 current source/current sink
40 current-steering switch
42 current-steering transistor
43 reduced-voltage gate driver
44 switch synchronizer
50 display
52 display substrate
54 display image
60, 60A, 60B, 60C image detector/light detector/digital camera
62 camera pixels
64 recorded image
70 light
90 optical communication system
100 turn on current source step
110 turn switch to first current load step
120 turn switch to second current load step
200 provide optical communication system step
210 receive image step
220 turn switch to current load step
230 display image step
240 camera capture image step
250 record image step
260 process recorded image step

What is claimed:

1. A current-steering circuit, comprising:
a first current load that is a light emitter;
a second current load;

a current source or current sink; and a current-steering switch, wherein the current-steering switch is operable to connect the first current load to the current source or current sink in a first switch mode and is operable to connect the second current load to the current source or current sink in a second switch mode different from the first switch mode, and wherein the current source or current sink is a current source and the current-steering switch is operable to switch current from the current source at a frequency no less than 1 MHz the current source or current sink is a current sink and the current-steering switch is operable to switch current to the current sink at a frequency no less than 1 MHz.

2. The current-steering circuit of claim 1, wherein the second current load is a non-light-emissive load.

3. The current-steering circuit of claim 1, wherein the light emitter is a first light emitter and the second current load is a second light emitter.

4. The current-steering circuit of claim 3, wherein the second light emitter emits light that has a different frequency from light emitted by the first light emitter.

5. The current-steering circuit of claim 4, wherein the second light emitter emits light that is not visible to a human visual system.

6. The current-steering circuit of claim 1, wherein the current source or current sink is a constant-current source or constant-current sink.

7. The current-steering circuit of claim 1, wherein the current source or current sink is constructed such that current provided thereby is a current selected to optimize efficiency of light emission from the light emitter.

8. The current-steering circuit of claim 1, wherein the current-steering switch comprises a current-steering transistor connected to each current load to control flow of current through the current load, the current-steering transistor responsive to a switch-control signal.

9. The current-steering circuit of claim 1, wherein the current-steering switch comprises a differential pair of transistors comprising sources and drains, wherein (i) the sources are connected in common to form a common connection and the drains form separate connections or (ii) the drains form a common connection and the sources form separate connections, wherein one of the differential pair of transistors is responsive to a positive switch-control signal and another of the differential pair of transistors is responsive to a negative version of the positive switch-control signal.

10. The current-steering display of claim 1, comprising a plurality of the current-steering circuits, wherein the current-steering display is a high-frame-rate display having a frame rate no less than 600 Hz.

11. A current-steering circuit, comprising:

a first current load that is a light emitter;

a second current load;

a current source or current sink; and a current-steering switch, wherein the current-steering switch is operable to connect the first current load to the current source or current sink in a first switch mode and is operable to connect the second current load to the current source or current sink in a second switch mode different from the first switch mode, and wherein the current-steering switch is responsive to a multi-bit switch-control signal comprising control bits, wherein the current-steering switch comprises successive levels of differential pairs of transistors, each successive level controlled by a different one of the control bits to provide the switch-control signal, wherein a final level of the successive levels controls current flow through the first current load and the second current load.

12. The current-steering circuit of claim 11, wherein each of the differential pair of transistors comprises sources and drains, wherein (i) the sources are connected in common to form a common connection and the drains form separate connections or (ii) the drains form a common connection and the sources form separate connections.

13. The current-steering circuit of claim 11, wherein the second current load is a non-light-emissive load.

14. The current-steering circuit of claim 11, wherein the light emitter is a first light emitter and the second current load is a second light emitter.

15. The current-steering circuit of claim 14, wherein the second light emitter emits light that has a different frequency from light emitted by the first light emitter.

16. The current-steering circuit of claim 15, wherein the second light emitter emits light that is not visible to a human visual system.

17. The current-steering circuit of claim 11, wherein the current source or current sink is a constant-current source or constant-current sink.

18. The current-steering circuit of claim 11, wherein the current source or current sink is constructed such that current provided thereby is a current selected to optimize efficiency of light emission from the light emitter.

19. The current-steering circuit of claim 11, wherein the current-steering switch comprises a current-steering transistor connected to each current load to control flow of current through the current load, the current-steering transistor responsive to a switch-control signal.

20. The current-steering circuit of claim 11, wherein the current-steering switch comprises a differential pair of transistors comprising sources and drains, wherein (i) the sources are connected in common to form a common connection and the drains form separate connections or (ii) the drains form a common connection and the sources form separate connections, wherein one of the differential pair of transistors is responsive to a positive switch-control signal and another of the differential pair of transistors is responsive to a negative version of the positive switch-control signal.

21. The current-steering display of claim 11, comprising a plurality of the current-steering circuits, wherein the current-steering display is a high-frame-rate display having a frame rate no less than 600 Hz.

* * * * *